US008930272B2

(12) United States Patent
Patel et al.

(10) Patent No.: US 8,930,272 B2
(45) Date of Patent: Jan. 6, 2015

(54) SYSTEMS AND METHODS FOR MOBILE TRANSACTIONS

(75) Inventors: Amol Patel, Los Altos, CA (US); F Malcolm Vernon, London (GB)

(73) Assignee: eBay Inc., San Jose, CA (US)

( * ) Notice: Subject to any disclaimer, the term of this patent is extended or adjusted under 35 U.S.C. 154(b) by 1061 days.

(21) Appl. No.: 12/339,794

(22) Filed: Dec. 19, 2008

(65) Prior Publication Data

US 2010/0161487 A1 Jun. 24, 2010

(51) Int. Cl.
*G06Q 40/00* (2012.01)
*G06Q 20/10* (2012.01)
*G06Q 40/02* (2012.01)

(52) U.S. Cl.
CPC .............. *G06Q 20/10* (2013.01); *G06Q 20/108* (2013.01); *G06Q 20/1085* (2013.01); *G06Q 40/02* (2013.01)
USPC ............................................. 705/43; 705/42

(58) Field of Classification Search
CPC . G06Q 20/10; G06Q 20/108; G06Q 20/1085; G06Q 40/02
USPC ...................................... 705/42, 43
See application file for complete search history.

(56) References Cited

U.S. PATENT DOCUMENTS

| | | | | |
|---|---|---|---|---|
| 5,915,023 | A * | 6/1999 | Bernstein | 705/75 |
| 7,004,385 | B1 * | 2/2006 | Douglass | 235/379 |
| 7,139,694 | B2 * | 11/2006 | Horn et al. | 705/64 |
| 7,175,073 | B2 * | 2/2007 | Kelley et al. | 235/379 |
| 7,418,427 | B1 * | 8/2008 | Drummond et al. | 705/43 |
| 7,571,140 | B2 * | 8/2009 | Weichert et al. | 705/40 |
| 7,577,612 | B2 * | 8/2009 | Waller et al. | 705/43 |
| 7,783,570 | B2 * | 8/2010 | Nicoll et al. | 705/43 |
| 8,014,755 | B2 * | 9/2011 | Sun et al. | 455/406 |
| 2001/0005840 | A1 * | 6/2001 | Verkama | 705/67 |
| 2001/0051920 | A1 * | 12/2001 | Joao et al. | 705/41 |
| 2001/0051922 | A1 * | 12/2001 | Waller et al. | 705/43 |
| 2001/0056402 | A1 * | 12/2001 | Ahuja et al. | 705/43 |
| 2003/0177028 | A1 * | 9/2003 | Cooper et al. | 705/1 |
| 2003/0217005 | A1 * | 11/2003 | Drummond et al. | 705/43 |
| 2004/0267663 | A1 * | 12/2004 | Karns et al. | 705/40 |
| 2004/0267667 | A1 * | 12/2004 | Ohara | 705/43 |
| 2005/0038744 | A1 * | 2/2005 | Viijoen | 705/42 |
| 2005/0065876 | A1 * | 3/2005 | Kumar | 705/39 |
| 2005/0097046 | A1 * | 5/2005 | Singfield | 705/42 |
| 2006/0100961 | A1 * | 5/2006 | Paterno et al. | 705/43 |
| 2006/0200410 | A1 * | 9/2006 | Kelley et al. | 705/43 |

(Continued)

OTHER PUBLICATIONS

Chinese First Office Action and translation thereof dated Dec. 5, 2012 for corresponding Chinese Application No. 200980151234.3.

(Continued)

*Primary Examiner* — Kenneth Bartley
(74) *Attorney, Agent, or Firm* — Haynes and Boone, LLP (57) ABSTRACT

In accordance with one or more embodiments of the present disclosure, systems and methods for facilitating financial transactions over a network include communicating with a user via a kiosk device and a mobile communication device over the network. In various implementations, the systems and methods include accessing at least one account related to the user, depositing finds into the account based on a cash deposit request received from the user at the kiosk device, and transferring funds from the account to one or more other accounts, related and/or unrelated to the user, based on a fund transfer request received from the user via the mobile communication device.

23 Claims, 5 Drawing Sheets

(56) References Cited

U.S. PATENT DOCUMENTS

| | | |
|---|---|---|
| 2006/0212407 A1 | 9/2006 | Lyon |
| 2007/0102508 A1* | 5/2007 | McIntosh .................. 235/379 |
| 2007/0174082 A1* | 7/2007 | Singh ............................ 705/1 |
| 2007/0199053 A1* | 8/2007 | Sandhu et al. ................ 726/4 |
| 2007/0203835 A1* | 8/2007 | Cai ............................. 705/43 |
| 2007/0219928 A1* | 9/2007 | Madhogarhia ............... 705/75 |
| 2007/0233615 A1* | 10/2007 | Tumminaro ................ 705/75 |
| 2008/0166995 A1* | 7/2008 | Sun et al. .................. 455/406 |
| 2008/0195536 A1* | 8/2008 | Karns et al. ................. 705/39 |
| 2008/0313087 A1* | 12/2008 | Joseph et al. .............. 705/66 |
| 2009/0076934 A1* | 3/2009 | Shahbazi et al. ........... 705/30 |
| 2009/0164371 A1* | 6/2009 | Arroyo et al. .............. 705/42 |
| 2009/0204546 A1* | 8/2009 | Haidar ......................... 705/75 |
| 2009/0254479 A1* | 10/2009 | Pharris ....................... 705/42 |
| 2009/0319360 A1* | 12/2009 | Salemi .................... 705/14.25 |
| 2010/0010932 A1* | 1/2010 | Law et al. .................. 705/42 |
| 2010/0057614 A1* | 3/2010 | Rainey et al. .............. 705/42 |
| 2010/0235283 A1* | 9/2010 | Gerson ........................ 705/75 |
| 2010/0241564 A1* | 9/2010 | Miller et al. ............... 705/43 |
| 2011/0119185 A1* | 5/2011 | Drummond et al. ........ 705/43 |
| 2011/0315761 A1* | 12/2011 | Smith et al. .............. 235/379 |

OTHER PUBLICATIONS

PCT International Search Report (ISR) and the Written Opinion mailed Dec. 9, 2009, in related International Application No. PCT/US2009/062638.

PCT International Preliminary Report on Patentability (IPRR) mailed Jun. 30, 2011, in related International Application No. PCT/US2009/062638.

Second Office Action from the State Intellectual Property Office (SIPO) mailed Aug. 1, 2013, in related Chinese Application No. 200980151234.3.

* cited by examiner

SYSTEMS AND METHODS FOR MOBILE TRANSACTIONS

BACKGROUND

1. Technical Field

The present invention generally relates to network transactions and more particularly to facilitating mobile transactions with cash based funding.

2. Related Art

In many online environments, a user navigates through selectable pages of service provider sites to view information resources, process financial transactions, and/or communicate with other users. In the recent past, cellular phones have been adapted to navigate communication networks, such as the Internet.

Generally, in some parts of the world, there are communities of people that use cash to exchange goods and services instead of using banking institutions and services for these types of financial transactions. However, some of these communities use cellular phones.

Presently, there is a need to provide the service of a banking institution to those that transact business with cash. As such, there is need to combine the service of banking with the common use of cellular phones.

SUMMARY

Systems and methods disclosed herein, in accordance with one or more embodiments, facilitate financial transactions via a mobile communication device, such as a cellular phone, with cash based funding via a kiosk device, such as a machine having a receptacle adapted to accept monetary funds, such as cash, as a physical input. In various implementations, a user may fund an account by depositing cash into a kiosk, machine, or in person at a store or other physical location. After depositing the cash, the user may proceed with monetary fund transfers into and out of an account related to the user using the mobile communication device (e.g., cellular phone).

In accordance with an embodiment of the present disclosure, a system for facilitating financial transactions over a network includes a first component adapted to communicate with a user via a kiosk device and a mobile communication device over the network and a second component adapted to access an account related to the user. The second component is adapted to deposit funds into the account based on a cash deposit request received from the user at the kiosk device. The second component is adapted to transfer funds from the account to one or more other accounts based on a fund transfer request received from the user via the mobile communication device.

In various implementations, user identification information may be passed with the cash deposit request from the kiosk device to the second component via the network and the first component, wherein the user identification information is used by the second component to verify an identify of the user and access the account related to the user. Similarly, user identification information may be passed with the fund transfer request from the mobile communication device to the second component via the network and the first component, wherein the user identification information is used by the second component to verify an identify of the user and access the account related to the user.

In various implementations, the kiosk device comprises an automated user interface, such as a computer, adapted to interface with the network and communicate with the second component via the network and the first component. The kiosk device may include a user interface application adapted to allow the user to communicate with the second component via the first component and the network and a receptacle adapted to receive cash from the user for deposit in the account. The mobile communication device comprises a cellular phone adapted to communicate with the second component via the network and the first component. The system comprises a server adapted to interface with the network and communicate with the kiosk device and the mobile communication device via the network.

In accordance with an embodiment of the present disclosure, a method for facilitating financial transactions over a network includes communicating with a user via a kiosk device over the network and a mobile communication device over the network and accessing an account related to the user. The method includes depositing funds into the account based on a cash deposit request received from the user at the kiosk device. The method includes transferring funds from the account to one or more other accounts based on a fund transfer request received from the user via the mobile communication device.

In various implementations, the method may include receiving a login request from the user via the kiosk device and verifying an identity of the user, wherein user identification information is passed with the cash deposit request from the kiosk device. The method may include receiving a login request from the user via the mobile communication device and verifying an identity of the user, wherein user identification information is passed with the fund transfer request from the mobile communication device.

These and other features and advantages of the present disclosure will be more readily apparent from the detailed description of the embodiments set forth below taken in conjunction with the accompanying drawings.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

One or more embodiments of the present disclosure relate to facilitating financial transactions via a mobile communication device, such as a cellular phone, with cash based funding via a kiosk device, such as a machine that accepts monetary funds, such as cash, as a physical input. In various implementations, a user may fund an account by depositing cash into a kiosk, machine, or in person at a store or other physical location. After depositing the cash, the user may proceed with transfers into and out of an account related to the user using a mobile communication device (e.g., a cellular phone). In one aspect, a user profile may be created using the data obtained from cellular phone activity.

One or more embodiments of the present disclosure enable people in communities without access to services of a banking institution to use the financial services of an online service provider via mobile communion devices including cellular phones. The user is able to fund an account with the online service provider by depositing cash into a kiosk device or machine at a physical location, which may be accomplished in various ways, such as the user directly depositing cash in the kiosk device or machine, or giving the cash to a cashier in a store or shop to deposit the cash in the kiosk device or machine. Once the user has funded an account via cash deposit, the user may then use the funds in the account to transact business via the user's cellular phone, such as transferring cash to other accounts related to the user and/or other accounts unrelated to the user. These transactions may be used by the online service provider to create a user profile based on the activity from the cellular phone.

Figure 1:
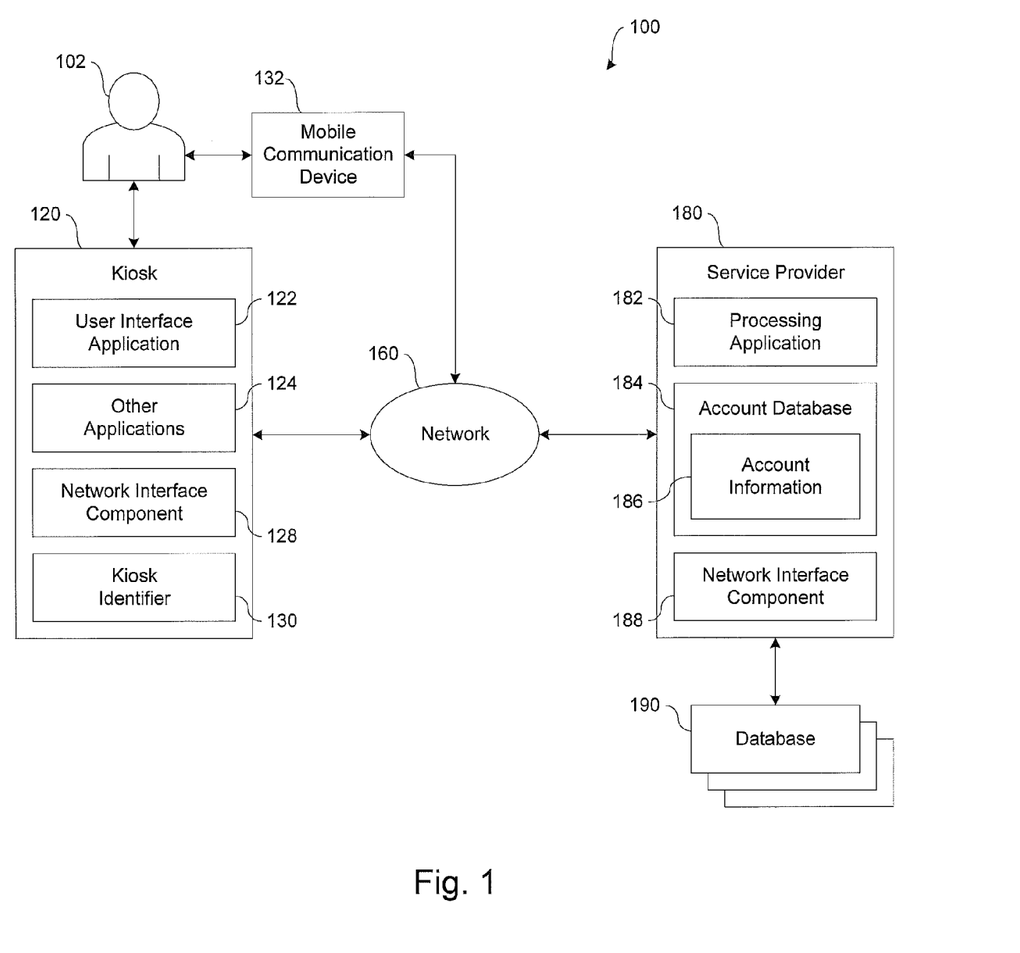
FIG. 1 shows a block diagram of a system adapted to facilitate financial transactions over a network, in accordance with an embodiment of the present disclosure.

FIG. 1 shows one embodiment of a block diagram of a system 100 adapted to facilitate mobile transactions over a network 160 with cash based funding. As shown in FIG. 1, the system 100 includes at least one kiosk device 120, at least one mobile device 132, and at least one service provider server 180 in communication over the network 160.

The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network may comprise a wireless telecommunications network (e.g., mobile cellular phone network) adapted to communicate with other communication networks, such as the Internet.

The kiosk device 120, in various embodiments, may be implemented using any appropriate combination of hardware and/or software configured for wired and/or wireless communication over the network 160. In various examples, the kiosk device 120 may be implemented as a wired and/or wireless communication device (e.g., an automated user interface device) for a user 102 (e.g., a client or customer) to communicate with the network 160, such as the Internet and/or mobile network. It should be appreciated that, in various embodiments, the kiosk device 120 may be referred to as a user device, client device or a customer device without departing from the scope of the present disclosure.

The kiosk device 120, in one embodiment, comprises a machine (e.g., automated teller machine (ATM)) adapted to directly accept monetary funds (e.g., cash) from a person, such as the user 102. In one implementation, the kiosk device 120 may be used by an operator, in person, at a store or other physical location, wherein the operator may receive monetary funds from the user 102 for deposit into the kiosk device 120. As such, the kiosk device 120 includes a cash receptacle (not shown) to receive cash for deposit in an account related to the user 102. In another implementation, the user 102 is able to input data and information into an input component (e.g., a keyboard) of the kiosk device 120 to provide user information with a transaction request, such as a cash deposit request. The user information may include user identification information, user account number, and a user password, which is described in greater detail herein.

The kiosk device 120 includes one or more user interface applications 122, which may be used by the user 102 to conduct financial transactions over the network 160. For example, the user interface application 122 may be implemented as an ATM application to deposit cash into an account over the network 160. In one implementation, the user interface application 122 comprises a software program, such as a graphical user interface (GUI), executable by a processor that is configured to interface and communicate with the one or more service provider servers 180 via the network 160.

The kiosk device 120, in various embodiments, may include one or more other applications 124 to provide additional features to the user 102. For example, these other applications 124 may include security applications for implementing client-side security features, programmatic client applications for interfacing with appropriate application programming interfaces (APIs) over the network 160 or various other types of generally known programs and/or applications.

The kiosk device 120, in one embodiment, may include at least one network interface component (NIC) 128 adapted to communicate with the network 160. In various examples, the network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

The kiosk device 120, in one embodiment, may include one or more kiosk identifiers 130, which may be implemented as operating system registry entries, cookies associated with the user interface application 122, identifiers associated with hardware of the kiosk device 120, and/or various other appropriate identifiers. The kiosk identifier 130 may include attributes related to the kiosk device 120, such as identification information (e.g., a kiosk serial number, a location address, Global Positioning System (GPS) coordinates, a network identification number, etc.) and network information (e.g., network owner, network provider, network administrator, network security information, etc.). In various implementations, the kiosk identifier 130 may be passed with network traffic data and information to the service provider server 180, and the kiosk identifier 130 may be used by the service provider server 180 to associate one or more network transactions of the user 102 with one or more particular user account maintained by the service provider server 180.

The mobile communication device 132, in one embodiment, may be utilized by the user 102 to interact with the service provider server 180 over the network 160. For example, the user 102 may conduct financial transactions (e.g., account transfers) with the service provider server 180 via the mobile communication device 132. In various implementations, the mobile communication device 132 may include at least one of a wireless cellular phone, personal digital assistant (PDA), satellite phone, etc. In one aspect, it should be appreciated by those skilled in the art that the mobile communication device 132 may be integrated as part of a client device (not shown), such as a personal computer, without departing from the scope of the present disclosure.

In various implementations, a user profile may be created using data and information obtained from cell phone activity over the network 160. Cell phone activity transactions may be used by the service provider server 180 to create at least one user profile for the user 102 based on activity from the mobile communication device 132 (e.g., cell phone). The user profile may be updated with each financial and/or information transaction (e.g., payment transaction, purchase transaction, etc.)

achieved through use of the mobile communication device 132. In various aspects, this may include the type of transaction and/or the location information from the mobile communication device 132. As such, the profile may be used for recognizing patterns of potential fraud, setting transaction limits on the user, etc.

The mobile communication device 132, in one embodiment, may include a user identifier as one or more attributes related to the user 102, such as personal information (e.g., a user name, password, photograph image, biometric id, address, social security number, phone number, email address, etc.) and banking information (e.g., banking institution, credit card issuer, user account numbers, security information, etc.). In various implementations, the user identifier may be passed with network traffic data of the user 102 to the service provider server 180, and the user identifier may be used by the service provider server 180 to associate the user 102 with a user account maintained by the service provider server 180.

In various implementations, the user 102 is able to input data and information into an input component (e.g., a keyboard) of the mobile communication device 132 to provide user information with a transaction request, such as a fund transfer request. The user information may include user identification information, user account number, and a user password, which is described in greater detail herein.

The service provider server 180, in various embodiments, may be maintained by an online service provider, which is adapted to provide processing for financial transactions on behalf of the user 102. The service provider server 180 includes at least one processing application 182, which may be adapted to interact with the kiosk device 120 and the mobile communication device 132 via the network 160 to facilitate financial transactions. In one example, the service provider server 180 may be provided by PayPal, Inc. of San Jose, Calif., USA.

The service provider server 180, in one embodiment, may be configured to maintain a plurality of user accounts in an account database 184, each of which may include account information 186 associated with individual users, including the user 102. For example, account information 186 may include balance information, fund transfer information, deposit information, etc. In another example, account information 186 may include identification information and/or private financial information of the user 102, such as account numbers, identifiers, passwords, phone numbers, credit card information, banking information, or other types of financial information, which may be used to facilitate online transactions between the user 102 of the kiosk device 120 and the service provider server 180. It should be appreciated that the methods and systems described herein may be modified to accommodate users that may or may not be associated with at least one existing user account.

The service provider server 180, in various embodiments, may include at least one network interface component (NIC) 188 adapted to communicate with the network 160 including the network interface component 128 of the kiosk device 120 and the mobile communication device 132. In various implementations, the network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

The service provider server 180, in various embodiments, may include one or more databases 190 (e.g., internal and/or external databases) for storing and tracking information related to financial transactions between particular users, such as the user 102, and the service provider server 180. For example, the databases 190 may provide an historical survey of financial transactions between the user 102 and the service provider 180. As such, in one implementation, the processing application 182 may be configured to track, log, store, and access financial transaction information and provide this information to the processing application 182 for analysis and maintenance.

In various embodiments, the kiosk device 120, the mobile communication device 132 and the service provider server 180 may be associated with a particular link (e.g., a link, such as a URL (Uniform Resource Locator) to an IP (Internet Protocol) address). In this regard, the user 102 may interface with the kiosk device 120 and/or the mobile communication device 132 via the network 160 to facilitate financial transactions with the service provider server 180, which is discussed in greater detail herein.

Figure 2A:
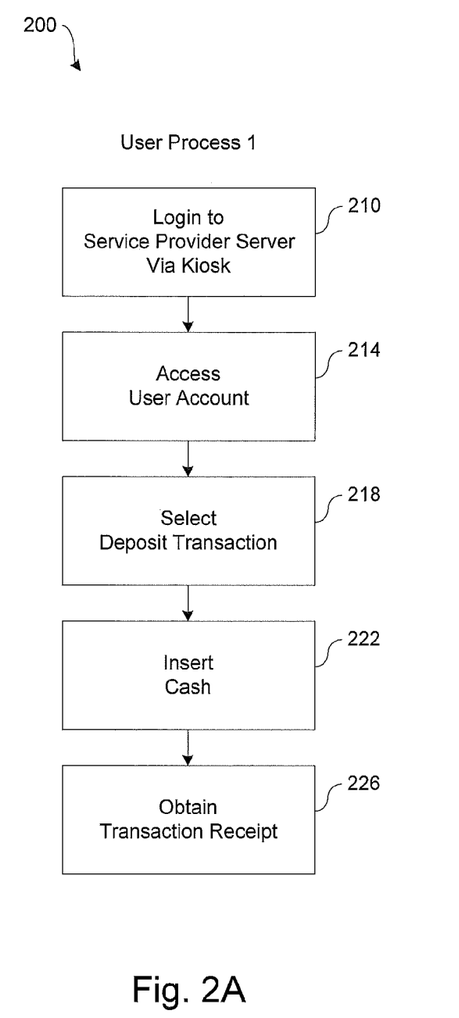
FIGS. 2A-2B show various client-side methods for facilitating financial transactions over a network, in accordance with embodiments of the present disclosure.

FIG. 2A shows one embodiment of a method 200 for facilitating financial transactions via the network 160 with cash based funding. In one implementation, the user 102 may run the user interface application 122 on the kiosk device 120 to access at least one resource provider site via the service provider server 180 to view account information 186 related to the user 102. Access to the service provider site may be made available to the user 102 by the service provider server 180, wherein the service provider server 180 uses the processing application 182 to interact with the user 102 via the server provider site.

Referring to FIG. 2A, the method 200 involves the user 102 interacting with the kiosk device 120 to login to the service provider server 180 (block 210). In one example, this may involve the user 102 accessing a service provider site via the kiosk device 120, which is adapted to communicate with the server provider server 180 via the network 160. The user 102 may provide an identification number and password to login to the service provider server 180. In one aspect, the kiosk device 120 serves as a gateway to the network 160 for cash based funding of an account related to the user 102.

Next, the user 102 accesses a user account in the account database 184 of the server provider server 180 (block 214). In one example, this may involve the user 102 selecting an appropriate user account after login. Next, the user 102 may select a financial transaction for processing, such as a cash deposit into the kiosk device 120 (block 218). In one example, this may involve the user 102 inserting cash into the kiosk device 120 when prompted by the kiosk device 120 (block 222). Next, the user 102 obtains a transaction receipt from the kiosk device 120 (block 226). In one example, the transaction receipt indicates the amounted of cash deposited and the date and time of the cash deposit.

Figure 2B:
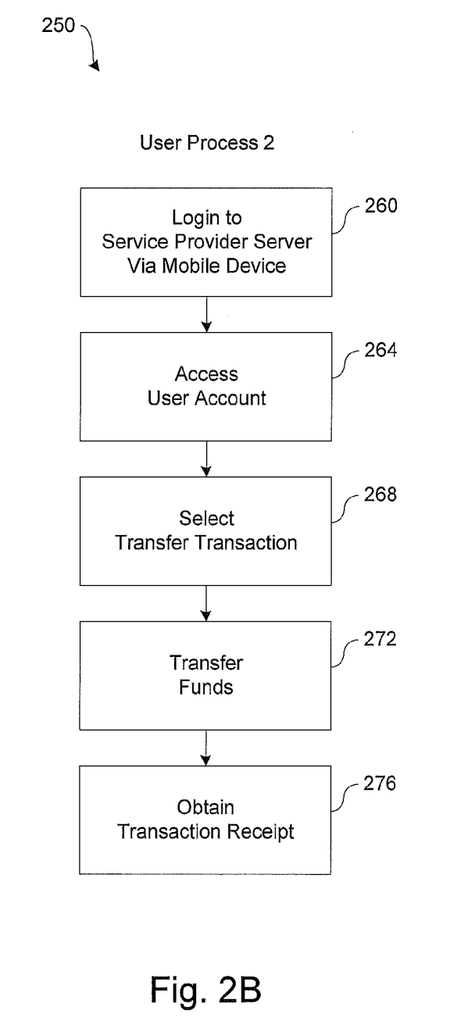

FIG. 2B shows one embodiment of a method 250 for facilitating financial transactions over the network 160 with the mobile communication device 132. In one implementation, the user 102 may use the mobile communication device 132 to access at least one service provider site via the service provider server 180 to process financial transactions and view account information 186 related to the user 102. Access to the service provider site may be made available to mobile communication device 132 of the user 102 by the service provider server 180, wherein the service provider server 180 uses the processing application 182 to interact with the user's mobile communication device 132 via the server provider site.

Referring to FIG. 2B, the method 250 involves the user 102 interacting with the mobile communication device 132 to login to the service provider server 180 (block 260). In one example, this may involve the user 102 accessing a service provider site via the mobile communication device 132, which is adapted to communicate with the server provider server 180 via the network 160. The user 102 may provide an identification number and password to login to the service provider server 180. Next, the user 102 accesses a user account in the account database 184 of the server provider server 180 (block 264). In one example, this may involve the user 102 selecting an appropriate user account after login.

Next, the user 102 may select a financial transaction for processing, such as a monetary fund transfer from the accessed user account to one or more other accounts (block 268). In various examples, this may involve the user 102 transferring monetary funds from the user account to one or more other accounts related and/or unrelated to the user 102 (block 272). In one aspect, the mobile communication device 132 serves as a gateway to the network 160 for monetary fund transfers between accounts specified by the user 102.

Next, the user 102 obtains a transaction receipt from the service provider server 180 (block 276). In various examples, the transaction receipt may be in the form of a text message and/or email, and the transaction receipt indicates the amount of monetary funds transferred, the account numbers involved in the monetary fund transfers, and the date and time of the monetary fund transfers.

Figure 3A:
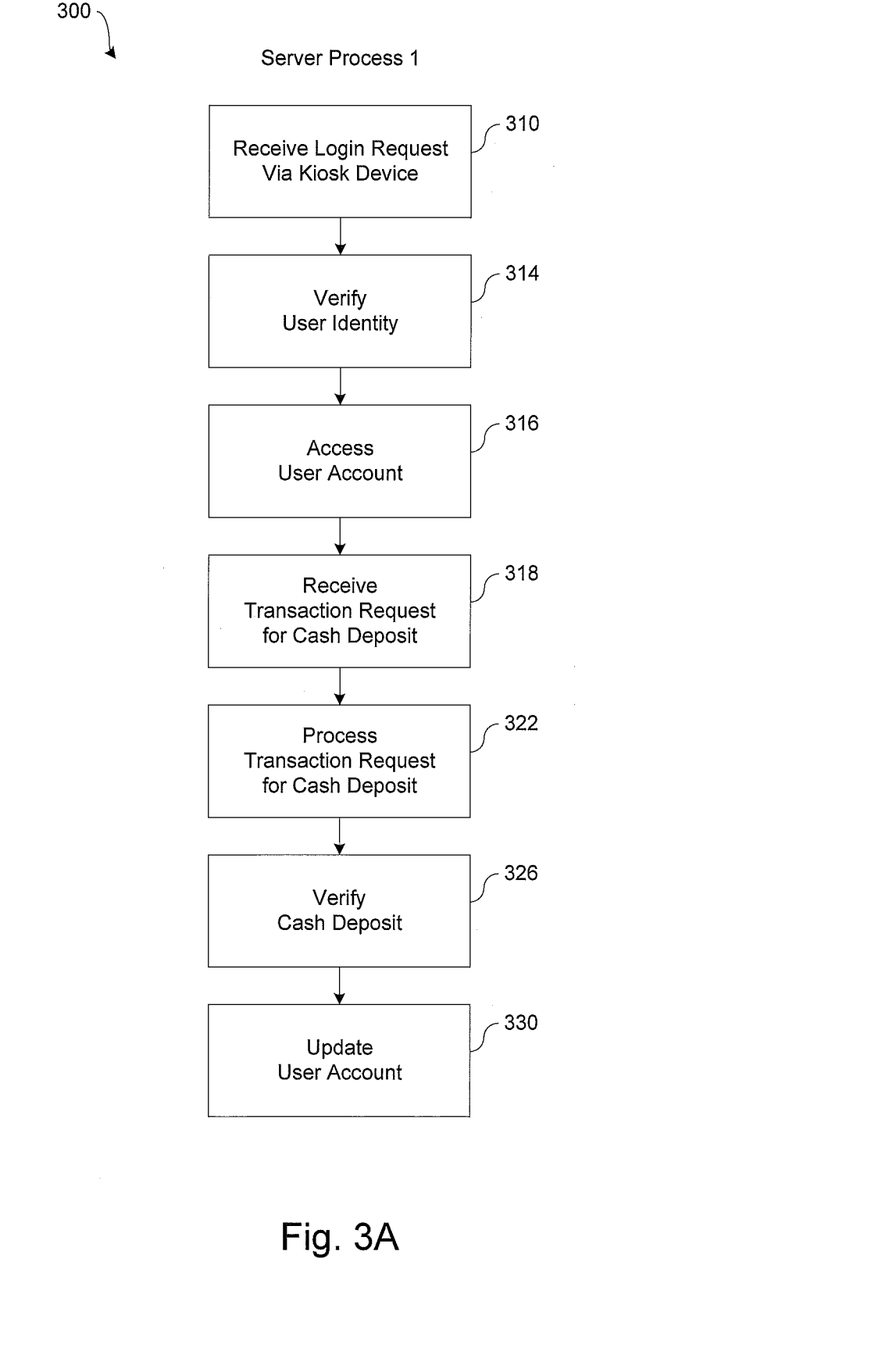
FIGS. 3A-3B show various server-side methods for facilitating financial transactions over a network, in accordance with embodiments of the present disclosure.

FIG. 3A shows one embodiment of a method 300 for facilitating financial transactions via the network 160 with cash based funding. In one implementation, the service provider server 180 interacts with the kiosk device 120 to process financial transactions related to the user 102 (e.g., cash deposits into a user account). Access to the service provider server 180 may be provided to the user 102 over the network 160 via the kiosk device 120, wherein the service provider server 180 may utilize the processing application 182 to interact with the user 102 via the kiosk device 120.

Referring to FIG. 3A, the service provider server 180 receives a login request via the kiosk device 120 (block 310), verifies the identity of the user 102 (block 314), and accesses at least one account related to the user 102 in the account database 184 (block 316). In one implementation, the user 102 interacts with the kiosk device 120 to provide an identification number and password to the kiosk device 120 for login to the service provider server 180 via the network 160. The service provider server 180 receives the identification number and password with the login request and verifies the identity of the user 102, for example, by comparing the identification number and password provided by the user 102 with the login request via the kiosk device 120 with an identification number and password stored as part of an account related to the user 102 in the account database 184. Next, the service provider server 180 locates and accesses at least one user account related to the user 102 based on the identification information provided by the user 102 as passed with the login request via the kiosk device 120.

Optionally, the service provider server 180 may determine whether the user 102 is an existing user having an established user account 184, for example, by checking a user account list in the account database 184. If the user 102 does not have an established user account, then the service provider server 180 may prompt the user 102 to establish a user account 184 with the service provider sever 180 by providing user identification and financial information 186 via the kiosk device 120.

Next, after login and account verification, the service provider server 180 receives a transaction request for a monetary fund deposit (e.g., cash deposit) from the user 102 via the kiosk device (block 318). Next, the service provider server 180 processes the transaction request for the cash deposit (block 322). In one example, the service provider server 180 accesses the user account related to the user 102 and credits the user account with the user deposited cash funds as received by the kiosk device 120. Next, the service provider server 180 verifies the cash deposit (block 326). In one example, the service provider server 180 may communicate with the kiosk device 120 to verify (e.g., authenticate) that the indicated amount of cash deposited by the user 102 was actually received and counted by the kiosk device 120. Next, the service provider server 180 updates the user account associated to the user 102 to reflect the cash deposit (block 330). It should be appreciated by those skilled in the art that the service provider server 180 may cancel the online information transaction at any point in the process if it is determined that the user 102 enters wrong information or the user 102 is trying to access information with criminal intent.

Figure 3B:
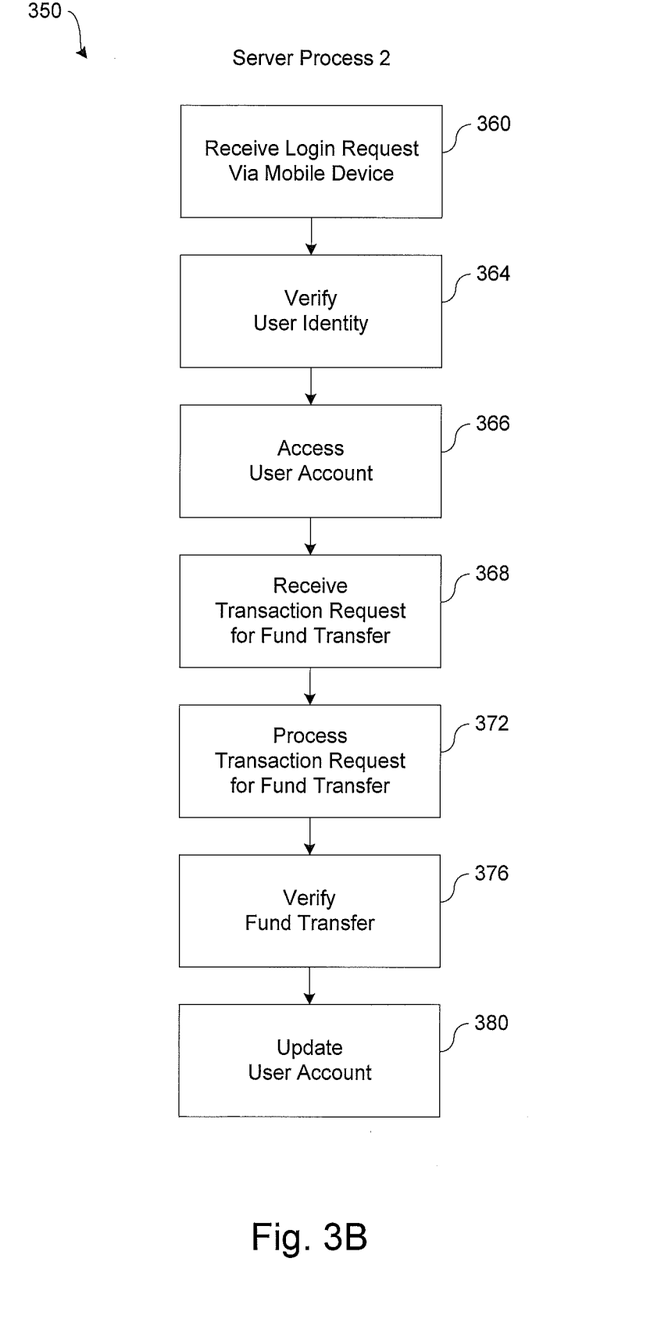

FIG. 3B shows one embodiment of a method 350 for facilitating financial transactions over the network 160 with the mobile communication device 132. In one implementation, the service provider server 180 interacts with the mobile communication device 132 to process financial transactions related to the user 102 (e.g., monetary fund transfers between user accounts and/or other accounts). Access to the service provider server 180 may be provided to the user 102 over the network 160 via the mobile communication device 132, wherein the service provider server 180 may utilize the processing application 182 to interact with the user 102 via the mobile communication device 132.

Referring to FIG. 3B, the service provider server 180 receives a login request via the mobile communication device 132 (block 360), verifies the identity of the user 102 (block 364), and accesses at least one account related to the user 102 in the account database 184 (block 366). In one implementation, the user 102 interacts with the mobile communication device 132 to provide an identification number and password to the mobile communication device 132 for login to the service provider server 180 via the network 160. The service provider server 180 receives the identification number and password with the login request and verifies the identity of the user 102, for example, by comparing the identification number and password provided by the user 102 with the login request via the kiosk device 120 with an identification number and password stored as part of an account related to the user 102 in the account database 184. Next, the service provider server 180 locates and accesses at least one user account related to the user 102 based on the identification information provided by the user 102 as passed with the login request via the mobile communication device 132.

Optionally, the service provider server 180 may determine whether the user 102 is an existing user having an established user account 184, for example, by checking a user account list in the account database 184. If the user 102 does not have an established user account, then the service provider server 180 may prompt the user 102 to establish a user account 184 with the service provider sever 180 by providing user identification and financial information 186 via the mobile communication device 132.

Next, after login and account verification, the service provider server 180 receives a transaction request for a monetary fund transfer between accounts from the user 102 via the mobile communication device 132 (block 368). Next, the service provider server 180 processes the transaction request for the monetary fund transfer (block 372). In one example, the service provider server 180 accesses the user account related to the user 102 and debits the user account for credit to another user account or some other account indicated by the user 102. Next, the service provider server 180 verifies that the monetary funds have been transferred as requested by the user 102 (block 376). In one example, the service provider server 180 may communicate with other financial organizations to verify (e.g., authenticate) that the indicated amount of monetary funds transferred was actually received and credited to the proper accounts. In another example, verification of monetary fund transfer may occur within the service provider server 180 if the accounts are in the account database 184. Next, the service provider server 180 updates the user account associated to the user 102 to reflect the monetary fund transfer (block 380). It should be appreciated by those skilled in the art that the service provider server 180 may cancel the online information transaction at any point in the process if it is determined that the user 102 enters wrong information or the user 102 is trying to access information with criminal intent.

Figure 4:
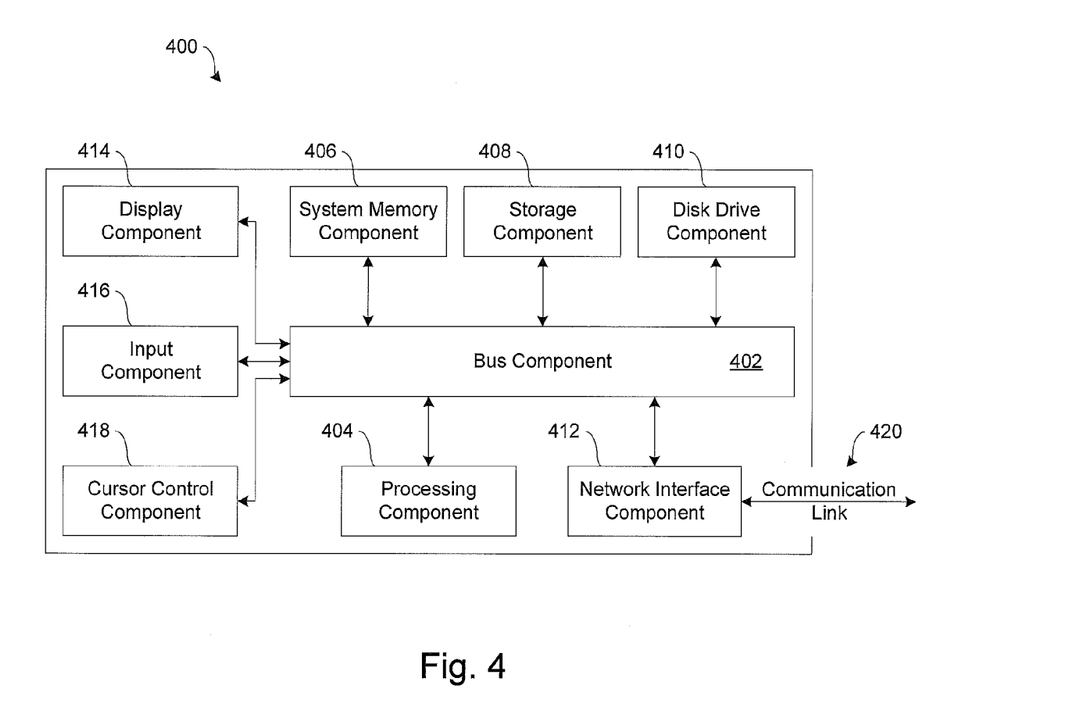
FIG. 4 is a block diagram of a computer system suitable for implementing one or more embodiments of the present disclosure.

FIG. 4 is a block diagram of a computer system 400 suitable for implementing one or more embodiments of the present disclosure, including the kiosk device 120, the mobile communication device 132, and the service provider server 180. In various implementations, the kiosk device 140 may comprise a stand-alone computing device, such as an interactive computer terminal, the mobile communication device 132 may comprise a mobile cellular phone, personal computer (PC), laptop, PDA, etc. adapted for wireless communication, and the service processing device 180 may comprise a network computing device, such as a server. Thus, it should be appreciated that the devices 120, 132, 180 may be implemented as computer system 400 in a manner as follows.

In accordance with various embodiments of the present disclosure, computer system 400 includes a bus 402 or other communication mechanism for communicating information, which interconnects subsystems and components, such as processing component 404 (e.g., processor, micro-controller, digital signal processor (DSP), etc.), system memory component 406 (e.g., RAM), static storage component 408 (e.g., ROM), disk drive component 410 (e.g., magnetic or optical), network interface component 412 (e.g., modem or Ethernet card, such as the network interface components 128, 188 as discussed in reference to FIG. 1), display component 414 (e.g., CRT or LCD), input component 416 (e.g., keyboard), and cursor control component 418 (e.g., mouse or trackball). In one implementation, disk drive component 410 may comprise a database having one or more disk drive components.

In accordance with embodiments of the present disclosure, computer system 400 performs specific operations by processor 404 executing one or more sequences of one or more instructions contained in system memory component 404. Such instructions may be read into system memory component 406 from another computer readable medium, such as static storage component 408 or disk drive component 410. In other embodiments, hard-wired circuitry may be used in place of or in combination with software instructions to implement the present disclosure.

Logic may be encoded in a computer readable medium, which may refer to any medium that participates in providing instructions to processor 404 for execution. Such a medium may take many forms, including but not limited to, non-volatile media, volatile media, and transmission media. In various implementations, non-volatile media includes optical or magnetic disks, such as disk drive component 410, volatile media includes dynamic memory, such as system memory component 406, and transmission media includes coaxial cables, copper wire, and fiber optics, including wires that comprise bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 420 (e.g., network 160 of FIG. 1, LAN, WLAN, PTSN, or various other wired or wireless networks) may perform instruction sequences to practice the present disclosure in coordination with one another.

Computer system 400 may transmit and receive messages, data, information and instructions, including one or more programs (i.e., application code) through communication link 420 and communication interface 412. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure.

Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system for facilitating financial transactions over a network, the system comprising:
   a service provider including a processing component to access a user account in a database, a network interface component configured to communicate with the network, and a memory component; wherein
      the service provider is adapted to communicate with a user via a kiosk device and directly through a mobile communication device over the network using the network interface component;

the service provider is adapted to access the user account using the processing component in response to the user entering login information for the user account directly into the kiosk;

the service provider is configured to deposit funds into the user account using the processing component based on a cash deposit request received from the user via the kiosk device, the cash deposit request including a kiosk identifier provided by the kiosk to associate the cash deposit with the user account, the kiosk identifier including attributes related to the kiosk and network information;

the service provider is configured to transfer the deposited funds from the user account to one or more other accounts by adding credit to the one or more other accounts using the processing component and the database, based on a fund transfer request received from the user directly through the mobile communication device when the fund transfer request does not match a pattern of potential fraud as determined from a user profile associated with the user account, the user profile being created using data and information obtained from types of transactions requested by the user with the service provider using the mobile communication device;

the service provider is configured to send a transaction receipt to the mobile communication device as at least one of a text message and an email, the transaction receipt including information related to the funds transfer; and the service provider maintains the database using the processing component for accessing the one or more other accounts.

2. The system of claim 1, wherein user identification information is passed with the cash deposit request received from the kiosk device by the service provider via the network using the network interface component, and wherein the user identification information is used by the service provider to verify an identity of the user and access the user account using the processing component.

3. The system of claim 1, wherein user identification information is passed with the fund transfer request from the mobile communication device to the service provider via the network using the network interface component, and wherein the user identification information is used by the service provider to verify an identify of the user and access the user account using the processing component.

4. The system of claim 1, wherein the memory component is adapted to store information related to the user, information related to the funds deposited into the user account, and information related to the funds transferred from the user account.

5. The system of claim 4, wherein the information related to the user includes at least one of a user account number, a user identification information, and a user password.

6. The system of claim 1, further comprising a display component adapted to display information related to the user, information related to the funds deposited into the user account, and information related to the funds transferred from the user account.

7. The system of claim 1, wherein the kiosk device comprises a computer adapted to interface with the network and communicate with the service provider via the network using a kiosk network interface component.

8. The system of claim 1, wherein the kiosk device comprises:

a user interface application adapted to allow the user to communicate with the service provider via the network using a kiosk network interface component; and a receptacle adapted to receive cash from the user for deposit in the user account.

9. The system of claim 1, wherein the mobile communication device comprises a cellular phone adapted to communicate with the service provider via the network using the network interface component.

10. A method for facilitating financial transactions over a network by a service provider, the method comprising:

communicating, by the service provider using a network interface component, with a user via a kiosk device over the network;

communicating, by the service provider, using a network interface component, with a user directly through a mobile communication device over the network using a network interface component;

accessing user account by the service provider using a processing component in response to the user entering login information for the account directly into the kiosk;

depositing by the service provider using the processing component funds into the user account based on a cash deposit request received from the user by the kiosk device by the service provider using the processing component, wherein the cash deposit request includes a kiosk identifier provided by the kiosk to associate the cash deposit with the user account, the kiosk identifier including attributes related to the kiosk and network information;

transferring by the service provider using a processing component the deposited funds from the user account to one or more other accounts by adding credit to the one or more other accounts based on a fund transfer request received from the user directly through the mobile communication device by the service provider using a processing component when the fund transfer request does not match a pattern of potential fraud as determined from a user profile associated with the user account, the user profile being created using data and information obtained from types of transactions requested by the user with the service provider using the mobile communication device;

sending by the service provider using a processing component a receipt including information related to the funds transfer as at least one of a text message and an email to the mobile communication device, wherein the service provider maintains a database using the processing component for accessing the one or more other accounts.

11. The method of claim 10, further comprising:

receiving a login request from the user via the kiosk device; and verifying an identity of the user, wherein user identification information is passed with the cash deposit request from the kiosk device.

12. The method of claim 10, further comprising:

receiving a login request from the user via the mobile communication device by the service provider using a network interface component; and verifying an identity of the user, wherein user identification information is passed with the fund transfer request from the mobile communication device.

13. The method of claim 10, further comprising storing at least one of information related to the user, information related to the funds deposited into the user account, and information related to the funds transferred from the user account by the service provider, in a memory component.

14. The method of claim 13, wherein the information related to the user includes at least one of a user account number, a user identification information, and a user password.

15. The method of claim 10, further comprising displaying at least one of information related to the user, information related to the funds deposited into the user account, and information related to the funds transferred from the user account.

16. The method of claim 10, wherein the kiosk device comprises a computer adapted to interface and communicate with the network.

17. The method of claim 10, wherein the kiosk device includes a user interface application adapted to allow the user to interact with the kiosk device.

18. The method of claim 10, wherein the mobile communication device comprises a cellular phone adapted to interface and communicate with the network.

19. A non-transitory computer readable medium configured to store data and commands to be executed by a processing component in a service provider and when executed operable to perform a method comprising:
   communicating the service provider with a user via a kiosk device over the network using a network interface component;
   communicating the service provider with the user directly through a mobile communication device over the network using the network interface component;
   accessing a user account by the service provider using the processing component in response to the user entering login information for the user account directly into the kiosk;
   depositing by the service provider funds into the user account using the processing component based on a cash deposit request received from the user by the kiosk device, wherein the cash deposit request includes a kiosk identifier provided by the kiosk, to associate the cash deposit with the user account, the kiosk identifier including attributes related to the kiosk and network information;
   transferring by the service provider using the processing component the deposited funds from the user account to one or more other accounts by adding credit to the one or more other accounts based on a fund transfer request received from the user via the mobile communication device when the fund transfer request does not match a pattern of potential fraud as determined from a user profile associated with the user account, the user profile being created using data and information obtained from types of transactions requested by the user with the service provider using the mobile communication device; and
   sending by the service provider a receipt including information related to the funds transfer to the as at least one of a text message and an email to the mobile communication device, wherein
   the service provider maintaining a database using the processing component for accessing the one or more other accounts.

20. The non-transitory computer readable medium of claim 19, further wherein the processing component is operable to:
   receive a login request from the user via the kiosk device; and
   verify an identity of the user,
   wherein user identification information is passed with the cash deposit request from the kiosk device.

21. The-non-transitory computer readable medium of claim 19, further wherein the processing component is operable to:
   receive a login request from the user via the mobile communication device; and
   verify an identity of the user,
   wherein user identification information is passed with the fund transfer request from the mobile communication device.

22. A system for facilitating financial transactions over a network, the system comprising:
   a service provider server including a processing component and a network interface component;
   the service provider server adapted to communicate with a user via a kiosk device and a mobile communication device over the network using the network interface component;
   the service provider server adapted to access a first user account, deposit funds into the first user account using the processing component in the service provider based on a cash deposit request received from the user at the kiosk device, transfer the deposited funds from a second user account to one or more accounts using the processing component in the service provider based on a fund transfer request received from the user via the mobile communication device when the fund transfer request is not a fraudulent request as determined from a user profile associated with the user account, the user profile being created using data and information obtained from types of transactions requested by the user with the service provider using the mobile communication device, and send a receipt including information related to the funds transfer to the as at least one of a text message and an email to the mobile communication device using the processing component; wherein
   at least one of the one or more accounts is unrelated to the user.

23. The system of claim 22, wherein the first user account and the second user account are the same; and
   the service provider server comprises a database using the processing component for accessing the first user account and the one or more accounts.

* * * * *